(12) United States Patent
Rosenbluth et al.

(10) Patent No.: US 7,225,281 B2
(45) Date of Patent: May 29, 2007

(54) MULTIPROCESSOR INFRASTRUCTURE FOR PROVIDING FLEXIBLE BANDWIDTH ALLOCATION VIA MULTIPLE INSTANTIATIONS OF SEPARATE DATA BUSES, CONTROL BUSES AND SUPPORT MECHANISMS

(75) Inventors: Mark B. Rosenbluth, Uxbridge, MA (US); Gilbert Wolrich, Framingham, MA (US); Debra Bernstein, Sudbury, MA (US); Myles J. Wilde, Charlestown, MA (US); Matthew J. Adiletta, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 10/212,944

(22) Filed: Aug. 5, 2002

(65) Prior Publication Data

US 2003/0105899 A1 Jun. 5, 2003

Related U.S. Application Data

(60) Provisional application No. 60/315,144, filed on Aug. 27, 2001.

(51) Int. Cl.
 *G06F 13/00* (2006.01)
(52) U.S. Cl. .................. 710/104; 710/316; 710/31
(58) Field of Classification Search ........ 710/104–107, 710/110–125, 309–317, 240–244, 31; 712/28–31
 See application file for complete search history.

(56) References Cited

U.S. PATENT DOCUMENTS 3,373,408 A 3/1968 Ling
3,478,322 A 11/1969 Evans
3,792,441 A 2/1974 Wymore et al.
3,881,173 A 4/1975 Larsen et al.
3,913,074 A 10/1975 Homberg et al.

(Continued)

FOREIGN PATENT DOCUMENTS

EP 0 379 709 8/1990

(Continued)

OTHER PUBLICATIONS

U.S. Appl. No. 09/475,614, filed Dec. 30, 1999, Wolrich et al.

(Continued)

*Primary Examiner*—Paul R. Myers
*Assistant Examiner*—Raymond N Phan
(74) *Attorney, Agent, or Firm*—Fish & Richardson P.C.

(57) ABSTRACT

A bus mechanism to control information exchanges between bus masters and bus targets over a bus structure that includes separate command, push and pull data buses. Commands are generated by bus masters and are interpreted by bus targets on a per-target basis. Each bus target controls the servicing of a command intended for such target by controlling the transfer of push data over the push bus to a bus master specified in the command as a destination, for a push operation type, and by controlling the transfer of pull data over the pull bus to the target from a bus master specified in the command as a destination, for a pull operation type. Arbitration logic associated with each bus is used to control the flow of the information exchanges on that bus.

26 Claims, 6 Drawing Sheets

U.S. PATENT DOCUMENTS

| | | | |
|---|---|---|---|
| 3,940,745 | A | 2/1976 | Sajeva |
| 4,023,023 | A | 5/1977 | Bourrez et al. |
| 4,045,782 | A | 8/1977 | Anderson et al. |
| 4,130,890 | A | 12/1978 | Adam |
| 4,189,767 | A | 2/1980 | Ahuja |
| 4,392,758 | A | 7/1983 | Bowles et al. |
| 4,400,770 | A | 8/1983 | Chan et al. |
| 4,514,807 | A | 4/1985 | Nogi |
| 4,523,272 | A | 6/1985 | Fukunaga et al. |
| 4,569,016 | A | 2/1986 | Hao et al. |
| 4,724,521 | A | 2/1988 | Carron et al. |
| 4,742,451 | A | 5/1988 | Bruckert et al. |
| 4,745,544 | A | 5/1988 | Renner et al. |
| 4,777,587 | A | 10/1988 | Case et al. |
| 4,833,657 | A | 5/1989 | Tanaka |
| 4,866,664 | A | 9/1989 | Burkhardt, Jr. et al. |
| 4,868,735 | A | 9/1989 | Moller et al. |
| 4,992,934 | A | 2/1991 | Portanova et al. |
| 5,008,808 | A | 4/1991 | Fries et al. |
| 5,073,864 | A | 12/1991 | Methvin et al. |
| 5,113,516 | A | 5/1992 | Johnson |
| 5,140,685 | A | 8/1992 | Sipple et al. |
| 5,142,676 | A | 8/1992 | Fried et al. |
| 5,142,683 | A | 8/1992 | Burkhardt, Jr. et al. |
| 5,155,831 | A | 10/1992 | Emma et al. |
| 5,155,854 | A | 10/1992 | Flynn et al. |
| 5,165,025 | A | 11/1992 | Lass |
| 5,166,872 | A | 11/1992 | Weaver et al. |
| 5,168,555 | A | 12/1992 | Byers et al. |
| 5,173,897 | A | 12/1992 | Schrodi et al. |
| 5,247,671 | A | 9/1993 | Adkins et al. |
| 5,255,239 | A | 10/1993 | Taborn et al. |
| 5,263,169 | A | 11/1993 | Genusov et al. |
| 5,274,770 | A | 12/1993 | Yeoh et al. |
| 5,347,648 | A | 9/1994 | Stamm et al. |
| 5,357,617 | A | 10/1994 | Davis et al. |
| 5,363,448 | A | 11/1994 | Koopman, Jr. et al. |
| 5,367,678 | A | 11/1994 | Lee et al. |
| 5,390,329 | A | 2/1995 | Gaertner et al. |
| 5,392,391 | A | 2/1995 | Caulk, Jr. et al. |
| 5,392,411 | A | 2/1995 | Ozaki |
| 5,392,412 | A | 2/1995 | McKenna |
| 5,404,464 | A | 4/1995 | Bennett |
| 5,404,482 | A | 4/1995 | Stamm et al. |
| 5,428,809 | A | 6/1995 | Coffin et al. |
| 5,432,918 | A | 7/1995 | Stamm |
| 5,436,626 | A | 7/1995 | Fujiwara et al. |
| 5,442,756 | A | 8/1995 | Grochowski et al. |
| 5,448,702 | A | 9/1995 | Garcia, Jr. et al. |
| 5,450,351 | A | 9/1995 | Heddes |
| 5,450,603 | A | 9/1995 | Davies |
| 5,452,437 | A | 9/1995 | Richey et al. |
| 5,459,842 | A | 10/1995 | Begun et al. |
| 5,463,625 | A | 10/1995 | Yasrebi |
| 5,467,452 | A | 11/1995 | Blum et al. |
| 5,481,683 | A | 1/1996 | Karim |
| 5,487,159 | A | 1/1996 | Byers et al. |
| 5,517,628 | A | 5/1996 | Morrison et al. |
| 5,517,648 | A | 5/1996 | Bertone et al. |
| 5,541,920 | A | 7/1996 | Angle et al. |
| 5,542,070 | A | 7/1996 | LeBlanc et al. |
| 5,542,088 | A | 7/1996 | Jennings, Jr. et al. |
| 5,544,236 | A | 8/1996 | Andruska et al. |
| 5,550,816 | A | 8/1996 | Hardwick et al. |
| 5,557,766 | A | 9/1996 | Takiguchi et al. |
| 5,568,617 | A | 10/1996 | Kametani |
| 5,574,922 | A | 11/1996 | James |
| 5,574,939 | A | 11/1996 | Keckler et al. |
| 5,592,622 | A | 1/1997 | Isfeld et al. |
| 5,600,812 | A | 2/1997 | Park |
| 5,606,676 | A | 2/1997 | Grochowski et al. |
| 5,610,864 | A | 3/1997 | Manning |
| 5,613,071 | A | 3/1997 | Rankin et al. |
| 5,613,136 | A | 3/1997 | Casavant et al. |
| 5,623,489 | A | 4/1997 | Cotton et al. |
| 5,627,829 | A | 5/1997 | Gleeson et al. |
| 5,630,130 | A | 5/1997 | Perotto et al. |
| 5,640,538 | A | 6/1997 | Dyer et al. |
| 5,644,623 | A | 7/1997 | Gulledge |
| 5,649,109 | A | 7/1997 | Griesmer et al. |
| 5,649,157 | A | 7/1997 | Williams |
| 5,652,583 | A | 7/1997 | Kang |
| 5,659,687 | A | 8/1997 | Kim et al. |
| 5,659,722 | A | 8/1997 | Blaner et al. |
| 5,680,641 | A | 10/1997 | Sidman |
| 5,689,566 | A | 11/1997 | Nguyen |
| 5,692,167 | A | 11/1997 | Grochowski et al. |
| 5,699,537 | A | 12/1997 | Sharangpani et al. |
| 5,701,435 | A | 12/1997 | Chi |
| 5,717,760 | A | 2/1998 | Satterfield |
| 5,717,898 | A | 2/1998 | Kagan et al. |
| 5,721,870 | A | 2/1998 | Matsumoto |
| 5,724,563 | A | 3/1998 | Hasegawa |
| 5,742,587 | A | 4/1998 | Zornig et al. |
| 5,742,782 | A | 4/1998 | Ito et al. |
| 5,742,822 | A | 4/1998 | Motomura |
| 5,745,913 | A | 4/1998 | Pattin et al. |
| 5,751,987 | A | 5/1998 | Mahant-Shetti et al. |
| 5,761,507 | A | 6/1998 | Govett |
| 5,761,522 | A | 6/1998 | Hisanaga et al. |
| 5,781,774 | A | 7/1998 | Krick |
| 5,784,649 | A | 7/1998 | Begur et al. |
| 5,784,712 | A | 7/1998 | Byers et al. |
| 5,790,813 | A | 8/1998 | Whittaker |
| 5,796,413 | A | 8/1998 | Shipp et al. |
| 5,797,043 | A | 8/1998 | Lewis et al. |
| 5,809,235 | A | 9/1998 | Sharma et al. |
| 5,809,530 | A | 9/1998 | Samra et al. |
| 5,812,799 | A | 9/1998 | Zuravleff et al. |
| 5,812,839 | A | 9/1998 | Hoyt et al. |
| 5,812,868 | A | 9/1998 | Moyer et al. |
| 5,813,031 | A | 9/1998 | Chou et al. |
| 5,815,714 | A | 9/1998 | Shridhar et al. |
| 5,819,080 | A | 10/1998 | Dutton et al. |
| 5,828,746 | A | 10/1998 | Ardon |
| 5,828,863 | A | 10/1998 | Barrett et al. |
| 5,829,033 | A * | 10/1998 | Hagersten et al. .......... 711/141 |
| 5,832,215 | A | 11/1998 | Kato et al. |
| 5,832,258 | A | 11/1998 | Kiuchi et al. |
| 5,835,755 | A | 11/1998 | Stellwagen, Jr. |
| 5,835,928 | A | 11/1998 | Auslander et al. |
| 5,854,922 | A | 12/1998 | Gravenstein et al. |
| 5,860,158 | A | 1/1999 | Pai et al. |
| 5,886,992 | A | 3/1999 | Raatikainen et al. |
| 5,887,134 | A | 3/1999 | Ebrahim |
| 5,890,208 | A | 3/1999 | Kwon |
| 5,892,979 | A | 4/1999 | Shiraki et al. |
| 5,893,162 | A | 4/1999 | Lau et al. |
| 5,905,876 | A | 5/1999 | Pawlowski et al. |
| 5,905,889 | A | 5/1999 | Wilhelm, Jr. |
| 5,915,123 | A | 6/1999 | Mirsky et al. |
| 5,933,627 | A | 8/1999 | Parady |
| 5,937,187 | A | 8/1999 | Kosche et al. |
| 5,938,736 | A | 8/1999 | Muller et al. |
| 5,940,612 | A | 8/1999 | Brady et al. |
| 5,940,866 | A | 8/1999 | Chisholm et al. |
| 5,946,487 | A | 8/1999 | Dangelo |
| 5,948,081 | A | 9/1999 | Foster |
| 5,951,679 | A | 9/1999 | Anderson et al. |
| 5,958,031 | A | 9/1999 | Kim |
| 5,961,628 | A | 10/1999 | Nguyen et al. |
| 5,970,013 | A | 10/1999 | Fischer et al. |
| 5,978,838 | A | 11/1999 | Mohamed et al. |
| 5,978,874 | A * | 11/1999 | Singhal et al. .............. 710/107 |

| | | |
|---|---|---|
| 5,983,274 A | 11/1999 | Hyder et al. |
| 5,996,068 A | 11/1999 | Dwyer, III et al. |
| 6,002,881 A | 12/1999 | York et al. |
| 6,009,505 A | 12/1999 | Thayer et al. |
| 6,009,515 A | 12/1999 | Steele, Jr. |
| 6,012,151 A | 1/2000 | Mano |
| 6,014,729 A | 1/2000 | Lannan et al. |
| 6,023,742 A | 2/2000 | Ebeling et al. |
| 6,029,170 A | 2/2000 | Garger et al. |
| 6,029,228 A | 2/2000 | Cai et al. |
| 6,047,334 A | 4/2000 | Langendorf et al. |
| 6,058,168 A | 5/2000 | Braband |
| 6,058,465 A | 5/2000 | Nguyen |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,076,129 A | 6/2000 | Fenwick et al. |
| 6,076,158 A | 6/2000 | Sites et al. |
| 6,079,008 A | 6/2000 | Clery, III |
| 6,079,014 A | 6/2000 | Papworth et al. |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,092,175 A | 7/2000 | Levy et al. |
| 6,112,016 A | 8/2000 | MacWilliams et al. |
| 6,115,811 A | 9/2000 | Steele, Jr. |
| 6,134,665 A | 10/2000 | Klein et al. |
| 6,141,348 A | 10/2000 | Muntz |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,145,123 A | 11/2000 | Torrey et al. |
| 6,157,955 A | 12/2000 | Narad et al. |
| 6,160,562 A | 12/2000 | Chin et al. |
| 6,173,349 B1 * | 1/2001 | Qureshi et al. ............... 710/110 |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,602 B1 | 4/2001 | Wicki et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,277 B1 | 4/2001 | Karguth |
| 6,223,279 B1 | 4/2001 | Nishimura et al. |
| 6,230,119 B1 | 5/2001 | Mitchell |
| 6,230,261 B1 | 5/2001 | Henry et al. |
| 6,233,599 B1 | 5/2001 | Nation et al. |
| 6,247,025 B1 | 6/2001 | Bacon |
| 6,247,040 B1 | 6/2001 | Born et al. |
| 6,247,086 B1 | 6/2001 | Allingham |
| 6,249,829 B1 | 6/2001 | Bloks et al. |
| 6,256,713 B1 | 7/2001 | Audityan et al. |
| 6,272,616 B1 | 8/2001 | Fernando et al. |
| 6,275,505 B1 | 8/2001 | O Loughlin et al. |
| 6,278,289 B1 | 8/2001 | Guccione et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,311,256 B2 | 10/2001 | Halligan et al. |
| 6,324,624 B1 | 11/2001 | Wolrich et al. |
| 6,345,334 B1 | 2/2002 | Nakagawa et al. |
| 6,347,344 B1 | 2/2002 | Baker et al. |
| 6,351,808 B1 | 2/2002 | Joy et al. |
| 6,356,962 B1 | 3/2002 | Kasper et al. |
| 6,357,016 B1 | 3/2002 | Rodgers et al. |
| 6,360,262 B1 | 3/2002 | Guenthner et al. |
| 6,366,978 B1 | 4/2002 | Middleton et al. |
| 6,373,848 B1 | 4/2002 | Allison et al. |
| 6,378,124 B1 | 4/2002 | Bates et al. |
| 6,389,449 B1 | 5/2002 | Nemirovsky et al. |
| 6,393,483 B1 | 5/2002 | Latif et al. |
| 6,401,149 B1 | 6/2002 | Dennin et al. |
| 6,415,338 B1 | 7/2002 | Habot |
| 6,426,940 B1 | 7/2002 | Seo et al. |
| 6,427,196 B1 | 7/2002 | Adiletta et al. |
| 6,430,626 B1 | 8/2002 | Witkowski et al. |
| 6,430,646 B1 * | 8/2002 | Thusoo et al. ............... 710/305 |
| 6,434,145 B1 | 8/2002 | Opsasnick et al. |
| 6,449,289 B1 * | 9/2002 | Quicksall ..................... 370/475 |
| 6,457,078 B1 * | 9/2002 | Magro et al. ................ 710/105 |
| 6,463,072 B1 | 10/2002 | Wolrich et al. |
| 6,490,642 B1 * | 12/2002 | Thekkath et al. ............ 710/110 |
| 6,496,925 B1 | 12/2002 | Rodgers et al. |
| 6,505,229 B1 | 1/2003 | Turner et al. |
| 6,523,108 B1 | 2/2003 | James et al. |
| 6,529,999 B1 | 3/2003 | Keller et al. |
| 6,532,509 B1 | 3/2003 | Wolrich et al. |
| 6,539,439 B1 | 3/2003 | Nguyen et al. |
| 6,552,826 B2 | 4/2003 | Adler et al. |
| 6,560,667 B1 | 5/2003 | Wolrich et al. |
| 6,570,877 B1 | 5/2003 | Kloth et al. |
| 6,577,542 B2 | 6/2003 | Wolrich et al. |
| 6,581,124 B1 * | 6/2003 | Anand ......................... 710/305 |
| 6,584,522 B1 | 6/2003 | Wolrich et al. |
| 6,587,906 B2 | 7/2003 | Wolrich et al. |
| 6,606,704 B1 * | 8/2003 | Adiletta et al. .............. 712/248 |
| 6,625,654 B1 | 9/2003 | Wolrich et al. |
| 6,628,652 B1 | 9/2003 | Chrin et al. |
| 6,629,237 B2 | 9/2003 | Wolrich et al. |
| 6,631,430 B1 | 10/2003 | Wolrich et al. |
| 6,631,462 B1 | 10/2003 | Wolrich et al. |
| 6,633,938 B1 * | 10/2003 | Rowlands et al. ........... 710/240 |
| 6,643,726 B1 * | 11/2003 | Patkar et al. ................ 710/306 |
| 6,654,836 B1 | 11/2003 | Misra et al. |
| 6,661,794 B1 | 12/2003 | Wolrich et al. |
| 6,661,795 B1 | 12/2003 | Adas et al. |
| 6,667,920 B2 | 12/2003 | Wolrich et al. |
| 6,668,311 B2 | 12/2003 | Hooper et al. |
| 6,668,317 B1 | 12/2003 | Bernstein et al. |
| 6,671,761 B2 * | 12/2003 | Kim ............................. 710/244 |
| 6,671,827 B2 | 12/2003 | Guilford et al. |
| 6,678,248 B1 | 1/2004 | Haddock et al. |
| 6,681,300 B2 | 1/2004 | Wolrich et al. |
| 6,694,380 B1 | 2/2004 | Wolrich et al. |
| 6,697,923 B2 | 2/2004 | Chen et al. |
| 6,724,767 B1 | 4/2004 | Chong et al. |
| 6,725,313 B1 * | 4/2004 | Wingard et al. ............. 710/305 |
| 6,728,845 B2 | 4/2004 | Adiletta et al. |
| 6,738,831 B2 | 5/2004 | Wolrich et al. |
| 6,754,662 B1 | 6/2004 | Li |
| 6,754,795 B2 | 6/2004 | Chen et al. |
| 6,781,992 B1 | 8/2004 | Rana et al. |
| 6,785,843 B1 | 8/2004 | McRae et al. |
| 6,823,399 B2 * | 11/2004 | Horiguchi et al. ............... 710/6 |
| 6,826,180 B1 | 11/2004 | Bergantino et al. |
| 6,847,645 B1 | 1/2005 | Potter et al. |
| 6,868,476 B2 | 3/2005 | Rosenbluth et al. |
| 6,889,319 B1 | 5/2005 | Rodgers et al. |
| 6,941,438 B2 | 9/2005 | Wolrich et al. |
| 6,958,973 B1 | 10/2005 | Chen et al. |
| 7,051,329 B1 | 5/2006 | Boggs et al. |
| 2001/0043614 A1 | 11/2001 | Viswanadham et al. |
| 2001/0046314 A1 | 11/2001 | Viswanadham et al. |
| 2002/0053017 A1 | 5/2002 | Adiletta et al. |
| 2002/0056037 A1 | 5/2002 | Wolrich et al. |
| 2003/0012198 A1 | 1/2003 | Kaganoi et al. |
| 2003/0041216 A1 | 2/2003 | Rosenbluth et al. |
| 2003/0041228 A1 | 2/2003 | Rosenbluth et al. |
| 2003/0046488 A1 | 3/2003 | Rosenbluth et al. |

| | | | |
|---|---|---|---|
| 2003/0065862 A1* | 4/2003 | Wyland | 710/305 |
| 2003/0078950 A1 | 4/2003 | Abernathy et al. | |
| 2003/0105899 A1 | 6/2003 | Rosenbluth et al. | |
| 2003/0145155 A1* | 7/2003 | Wolrich et al. | 711/104 |
| 2003/0145159 A1 | 7/2003 | Adiletta et al. | |
| 2003/0191866 A1 | 10/2003 | Wolrich et al. | |
| 2004/0034743 A1 | 2/2004 | Wolrich et al. | |
| 2004/0039895 A1 | 2/2004 | Worlich et al. | |
| 2004/0054880 A1 | 3/2004 | Bernstein et al. | |
| 2004/0071152 A1 | 4/2004 | Wolrich et al. | |
| 2004/0073728 A1 | 4/2004 | Wolrich et al. | |
| 2004/0073778 A1 | 4/2004 | Adiletta et al. | |
| 2004/0098496 A1 | 5/2004 | Wolrich et al. | |
| 2004/0109369 A1 | 6/2004 | Wolrich et al. | |
| 2004/0139290 A1 | 7/2004 | Wolrich et al. | |
| 2004/0205747 A1 | 10/2004 | Bernstein et al. | |
| 2005/0132132 A1 | 6/2005 | Rosenbluth et al. | |
| 2005/0185437 A1 | 8/2005 | Wolrich et al. | |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| EP | 0 953 897 | 11/1999 |
| EP | 1 191 445 | 3/2002 |
| JP | 59111533 | 6/1984 |
| WO | WO 94/15287 | 7/1994 |
| WO | WO 97/38372 | 10/1997 |
| WO | WO 00/33195 | 6/2000 |
| WO | WO 01/15718 | 3/2001 |
| WO | WO 01/16697 | 3/2001 |
| WO | WO 01/16698 | 3/2001 |
| WO | WO 01/16702 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

U.S. Appl. No. 09/473,571, filed Dec. 28, 1999, Wolrich et al.
Byrd et al., "Multithread Processor Architectures," *IEEE Spectrum*, vol. 32, No. 8, New York, Aug. 1, 1995, pp. 38-46.
Doyle et al., *Microsoft Press Computer Dictionary*, 2$^{nd}$ ed., Microsoft Press, Redmond, Washington, USA, 1994, p. 326.
Fillo et al., "The M-Machine Multicomputer," IEEE Proceedings of MICRO-28, 1995, pp. 146-156.
Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.
Haug et al., "Reconfigurable hardware as shared resource for parallel threads," IEEE Symposium on FPGAs for Custom Computing Machines, 1998.
Hauser et al., "Garp: a MIPS processor with a reconfigurable coprocessor," Proceedings of the 5$_{th}$ Annual IEEE Symposium on Field-Programmable Custom Computing Machines, 1997.

Hyde, R., "Overview of Memory Management," *Byte*, vol. 13, No. 4, 1998, pp. 219-225.
Litch et al., "Strongarming Portable Communications," IEEE Micro, 1998, pp. 48-55.
Schmidt et al., "The Performance of Alternative Threading Architectures for Parallel Communication Subsystems," Internet Document, *Online!*, Nov. 13, 1998.
Thistle et al., "A Processor Architecture for Horizon," IEEE, 1998, pp. 35-41.
Tremblay et al., "A Three Dimensional Register File for Superscalar Processors," IEEE Proceedings of the 28$^{th}$ Annual Hawaii International Conference on System Sciences, 1995, pp. 191-201.
Trimberger et al, "A time-multiplexed FPGA," Proceedings fo the 5$^{th}$ Annual IEEE Symposium on Field-Programmable Custom Computing Machines, 1998.
Turner et al., "Design of a High Performance Active Router," Internet Document, *Online*, Mar. 18, 1999.
Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.
Waslowski et al., "PRSIM-II computer and architecture," IEEE Proceedings, Workshop on FPGAs for Custom Computing Machines, 1993.
Romilly Bowden, "What is HART!", Romilly's Hart and Fieldbus Web Site, 'Online! 1977 XP002219605, http://www.romilly.co.uk/whathart.htm.
"HART, Field Communications Protocol, Application Guide", 'Online! 1999, Hart Communication Foundation, Austin, TX, XP002219606, http://lhc-div.web.cern.ch/lhc-div/IAS/WS/WorldFip/Labo/appguide.pdf.
"Intel IXP1200 Network Processor Family", Hardware Reference Manual, 272 pages (Dec. 2001).
"IXP1200 Network Processor", Data Sheet, 144 pages (Mar. 2000).
*C-5 Network Processor Architecture Guide*, C-Port Corporation, Freescale Semiconductor, Inc., Part No. C5NPD0-AG/D, May 31, 2001, 642 pages.
Shu-Ping Chang, et al., *An Overview of the Pipelined Common Buffer Architecture (PCBA) for Memory Based Packet/Cell Switching Systems*, pp. 288-297, IEEE Oct. 2, 1994.
Yu-Sheng Lin et al., *Queue Management for Shared Buffer and Shared Multi-buffer ATM Switches*, pp. 688-695, IEEE, Mar. 24, 1996.
Gregory L. Frazier, et al., *The Design and Implementation of a Multi-Queue Buffer For VLSI Communication Switches*, pp. 466-471, IEEE 1989.
Gregory L. Frazier, et al., *Ths Design and Implementation of a Multi-Queue Buffer For VLSI Communication Switches*, pp. 466-471, IEEE 1989.
Agarwal et al., "April: A Processor Architecture for Multiprocessing," Proceedings of the 17$^{th}$ Annual International Symposium on Computer Architecture, IEEE, pp. 104-114.
Chang et al., "Branch Classification: A New Mechanism For Improving Branch Predictor Performance," IEEE, pp. 22-31 (1994).
Farkas et al., "The multicluster architecture: reducing cycle time through partitioning, " IEEE, vol. 30, Dec. 1997, pp. 149-159.
Hennessy et al., "Computer Organization and Design: The Hardware/Software Interface," Morgan Kaufman Publishers, 1998, pp. 116-119,181-182, 225-227, 466-470, 476-482, 510-519, 712.
Intel, "1A-64 Application Developer's Architecture Guide," Rev.1. 0, May 1999, pp. 2-2, 4-29 to 4-31, 7-116 to 7-118 and c-21.
Keckler et al., "Exploiting fine grain thread level parallelism on the MIT Multi-ALU processor," IEEE, Jun. 1998.
Mendelson A. et al., "Design Alternatives of Multithreaded Architecture", *International Journal of Parallel Programming*, Plenum Press, New York, 27(3):161-193, Jun. 1999.
Paver et al., "Register Locking in Asynchronous Processor Computer Design: VLSI Processors," ICCD '92 Proceedings, IEEE 1992 International Conference, 1992, pp. 351-355.
Wadler, "The Concatenate Vanishes," University of Glasgow, Dec. 1987 (revised Nov. 1989), pp. 1-7.
Waldspurger et al., "Register Relocation: Flexible Contents for Multithreading," Proceedings of the 20th Annual International Symposium on Computer Architecture, 1993, pp. 120-130.

* cited by examiner

MULTIPROCESSOR INFRASTRUCTURE FOR PROVIDING FLEXIBLE BANDWIDTH ALLOCATION VIA MULTIPLE INSTANTIATIONS OF SEPARATE DATA BUSES, CONTROL BUSES AND SUPPORT MECHANISMS

CROSS REFERENCE TO RELATED APPLICATIONS

This application claims priority from U.S. Provisional Patent Application Ser. No. 60/315,144, filed Aug. 27, 2001.

BACKGROUND

Conventional bus schemes define a bus as an indivisible unit. Although commands and data may be transmitted over separate physical channels to improve concurrency, the bus protocols link the channels. The commands include a fixed number of predefined fields of command information, such as address, length (number of data bytes) and operation type (e.g., read, write, cacheline flush, and so forth).

DETAILED DESCRIPTION

Figure 1:
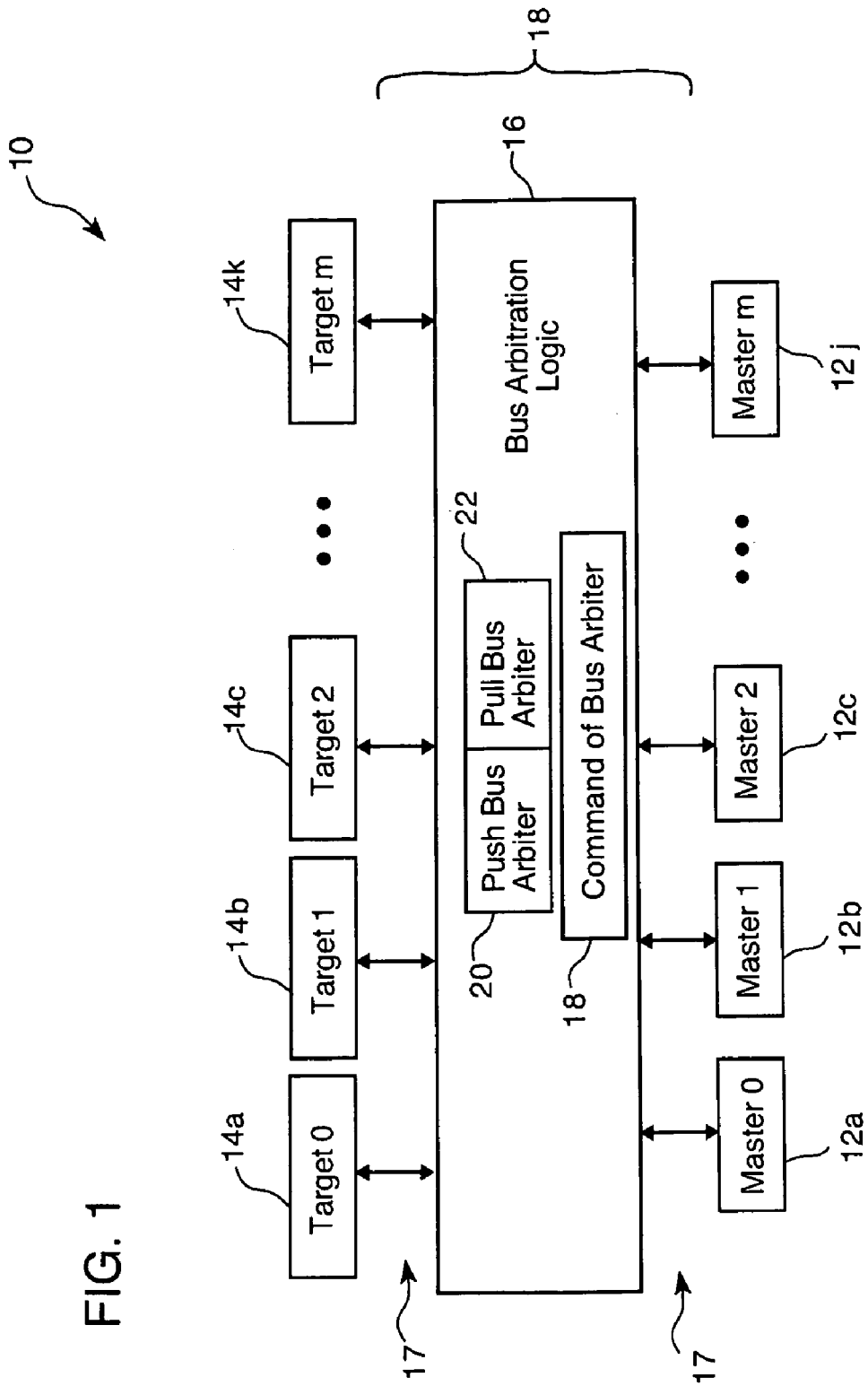
FIG. 1 is a block diagram of a processing system employing bus arbitration logic to support exchanges between bus masters and bus targets.

Referring to FIG. 1, a system 10 having multiple first units 12, shown as masters 12a, 12b, 12c, ..., 12j, and multiple second units 14, shown as targets 14a, 14b, 14c, ..., 14k that use bus arbitration logic 16 to control exchanges of information over a bus system 17 is shown. Collectively, the bus system 17 and bus arbitration logic 16 form a bus structure 18. The components of the bus arbitration logic 16 include a command bus arbiter 19, a push bus arbiter 20 and a pull bus arbiter 22. These arbiters 19, 20, 22 are associated with the operation of the various buses in the bus system 17, as will be described with reference to FIGS. 2–6.

The masters 12 can include devices such as processors (e.g., general purpose microprocessors, embedded microcontrollers) and external bus controllers. The targets 14 can include memory resources (e.g., interfaces to DRAM, SRAM), I/O resources (e.g., interfaces to media, media switch fabric), as well as other types of system resources. A master can also serve as a target. For example, a bus controller that allows the system to communicate with a host or other system via an external bus could perform the functions of both master and target.

For simplicity, only two of the masters, masters 0 and 1, and three of the targets, targets 0–2, are shown in FIGS. 2–6.

One of the masters, master 0, is depicted as a device that can serve as both a master and a target.

Figure 2:
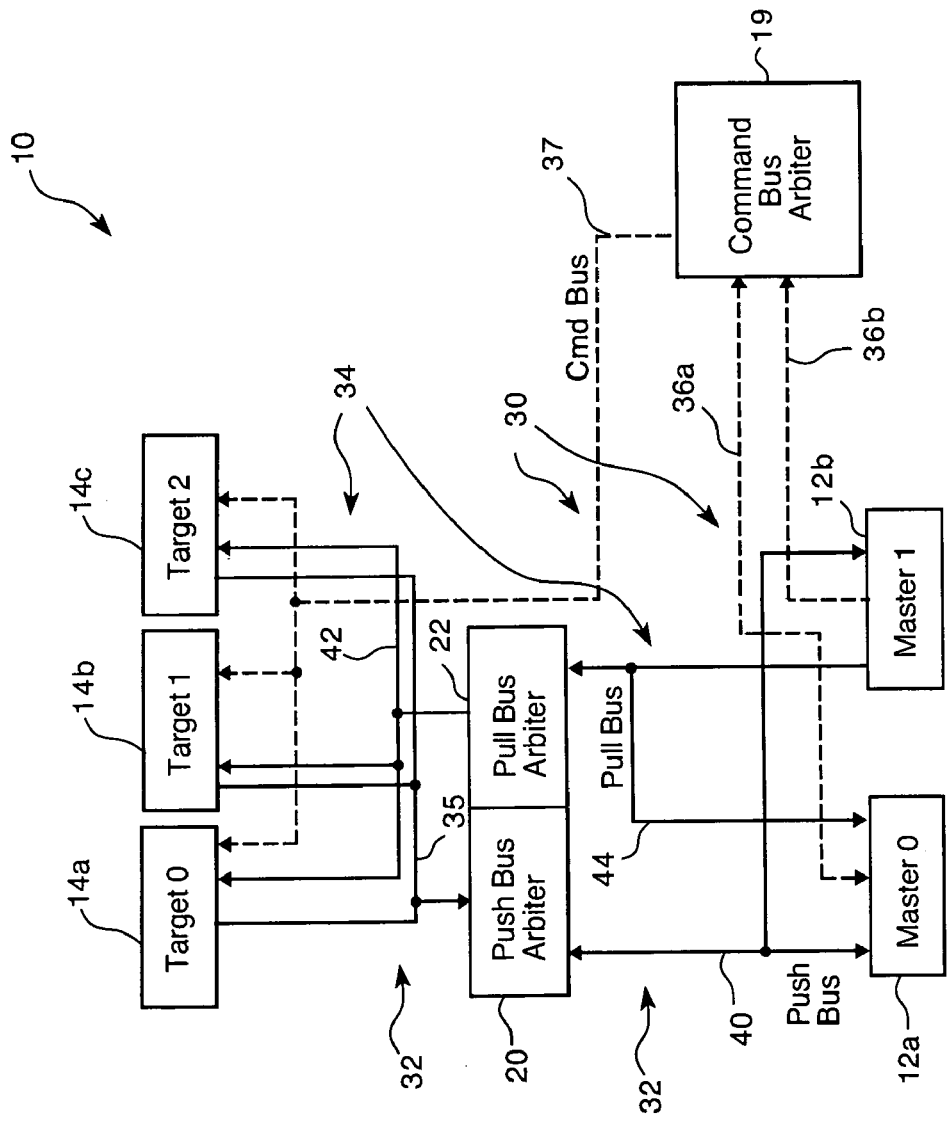
FIG. 2 is a detailed block diagram of the processing system (of FIG. 1) showing various buses, including command and push/pull buses, and associated arbiters of the bus arbitration logic.

Referring to FIG. 2, the system 10 includes three separate bus structures, a command bus 30 (indicated in dashed lines), a push bus 32 and a pull bus 34. The respective arbitration units 19, 20 and 24 are associated with and control the use of the command bus 30, the push bus 32 and the pull bus 34 respectively. The command bus 30 includes, on the master side of the arbitration logic, a first command bus 36, and on the target side of the arbiters, a second command bus 37. The master side command bus 36 includes a corresponding command bus for each master, for example, command buses 36a and 36b for master 12a and master 12b, respectively.

The push bus 32 includes a first push bus (target side) 38 and a second push bus (master side) 40. The pull bus includes a first pull bus (target side) 42 and a second pull bus 44 (master side). On the target side, the target push bus 38 and target pull bus 42 are used by the targets to transport commands and data between the targets and the push bus arbiter 20 and pull bus arbiter 22, respectively.

The masters 12a and 12b use the command bus arbiter 19 to arbitrate for use of the command bus 30 and, in particular, the target side command bus 37. The targets 14a, 14b, 14c each use the push bus arbiter 20 and the pull bus arbiter 22 to arbitrate for use of the master side push bus 40 and the pull bus 34, respectively. Control signals related to bus arbitration (not shown) will be discussed later with reference to FIGS. 4–6.

Figure 3:
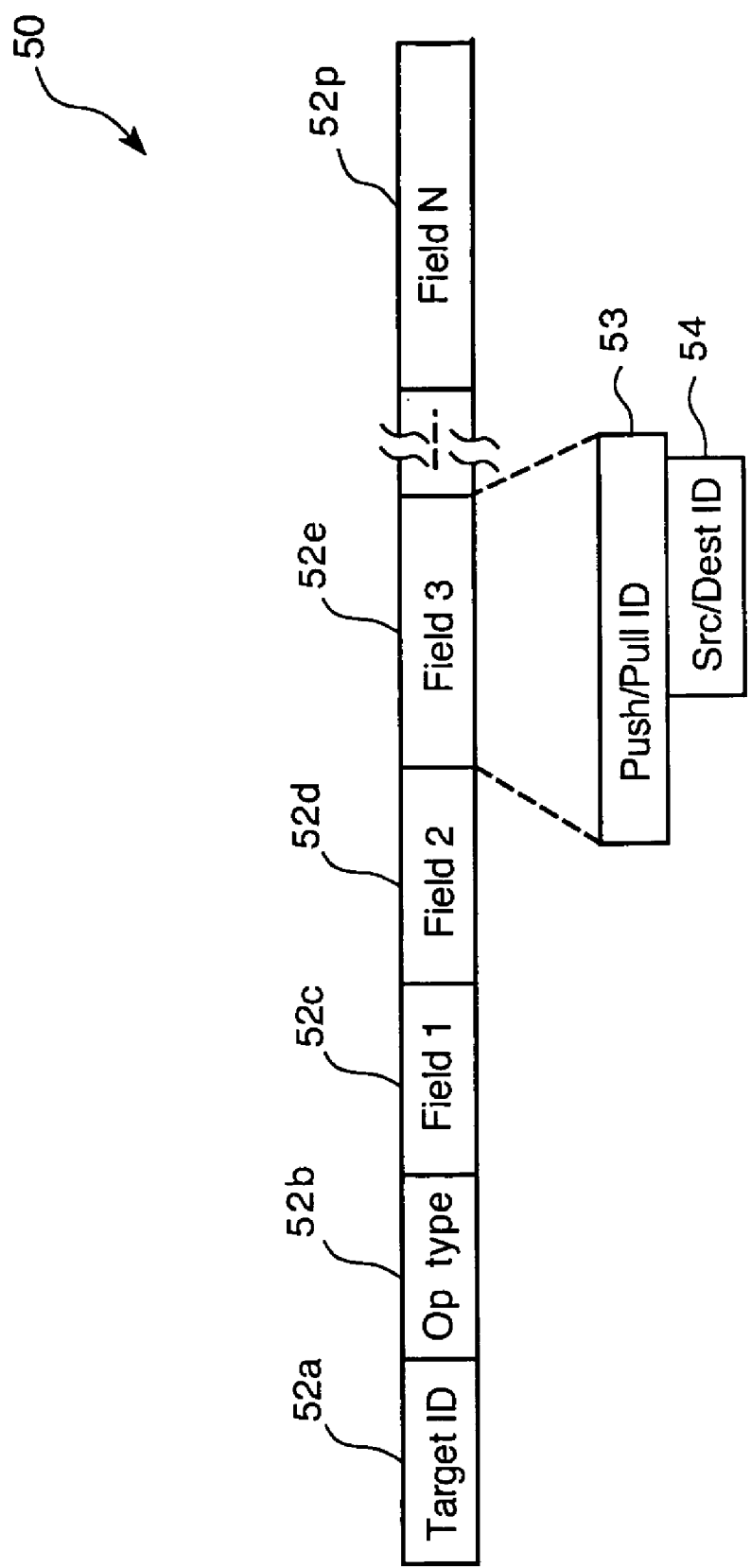
FIG. 3 is an illustration of an exemplary format of a command carried over the command bus.

Referring to FIG. 3, an exemplary format of a command 50 carried over the command bus 30 is shown. The command 50 is partitioned into multiple fields 52a, 52b, 52c, ... 52p that carry encoded information. The fields 52 can be of differing widths. The fields 52 include a target ID field 52a and an operation (or command) type field 52b. Each target 14 has a unique, hardwired identification number ("ID"). The target ID field 52a indicates, by ID, which of the targets should accept the command. The masters 12 send a command in the format of the command 50 to all of the targets 14, which decode the target ID in parallel to determine if the command 50 is meant for them. A set of codes corresponding to target IDs for an exemplary set of targets is shown in TABLE 1:

TABLE 1

| Code | Target |
| --- | --- |
| 00 0000 | None (no command on the command bus) |
| 00 0001 | Media Interface |
| 00 0010 | SRAM Interface |
| 00 0011 | DRAM Interface |
| 00 1001 | Bus Controller |
| 00 0100 | Hash Unit |

The operation type field 52b specifies an operation type. Each target interprets the operation type specified by the code in the operation type field 52b to determine the operation to be performed. The value in the operation type field 52b determines how values in other fields are to be interpreted by each target. The operation type can include as many different encodings of information as operation types that most (if not all) target units support, for example, read and write. One or more of the fields 52c–52p can be used as operation type extensions, based on the value in operation type field, as well. An exemplary encoding for some commands types supported by the targets shown in TABLE 1 above are shown in TABLE 2:

TABLE 2

| Code | DRAM I/F | SRAM I/F | Hash Unit | Media I/F | Bus Controller |
|---|---|---|---|---|---|
| 0000 | Read | Read | Hash | Read | Read |
| 0001 | Write | Write | Reserved | Write | Write |
| 0010 | Receive_Buffer Read | Swap | Reserved | Reserved | Reserved |
| 0011 | Transmit_Buffer Write | Set bits | Reserved | Reserved | Reserved |
| 0100 | Control Status Registers (CSR) Read | Clear bits | Reserved | Reserved | Reserved |
| 0101 | CSR Write | Add | Reserved | Reserved | Reserved |

The remaining fields 52c through 52p (corresponding to fields Field_1, Field_2, . . . , Field_N) hold other parameters the targets 14, such as address and burst count. For example, and as shown in the command format of FIG. 3, Field 3 is used to specify a push/pull ID 53, which identifies a source or destination 54, among other types of information. The push/pull ID 53 is passed to the target 14 via the command bus 30, and provided by the target to the push bus arbiter or the pull bus arbiter when the command is serviced. The push bus arbiter or the pull bus arbiter arbiter, as appropriate in turn, provides the push/pull ID to the appropriate source case of a pull operation) or destination (in the case of a push operation) as an address. The definition of fields within the push/pull ID field may be dependent on the specified source or destination. In addition, one or more of the Fields 1 through N may be used differently based on operation type. For example, a field can indicate byte masks for a write operation type and priority level for a read operation type.

According to the bus protocol of system 10, each target that receives a command in the form of the command 50 interprets the fields 52 on a per-target basis. This enables the targets to supply a rich set of functions, such as read-modify-write with programmable modify, data transform (e.g., perform a hash on operands and return result) and fast write (use some fields of the command to specify data and others to specify address, eliminating the latency and resource use of data bus).

The masters 12 issue commands to the targets 14 based on instruction execution, or some other appropriate mechanism. For example, if the master is a bus controller, it may issue commands as a result of a DMA operation or when it is being accessed by another device on the bus that it controls.

Figure 4:
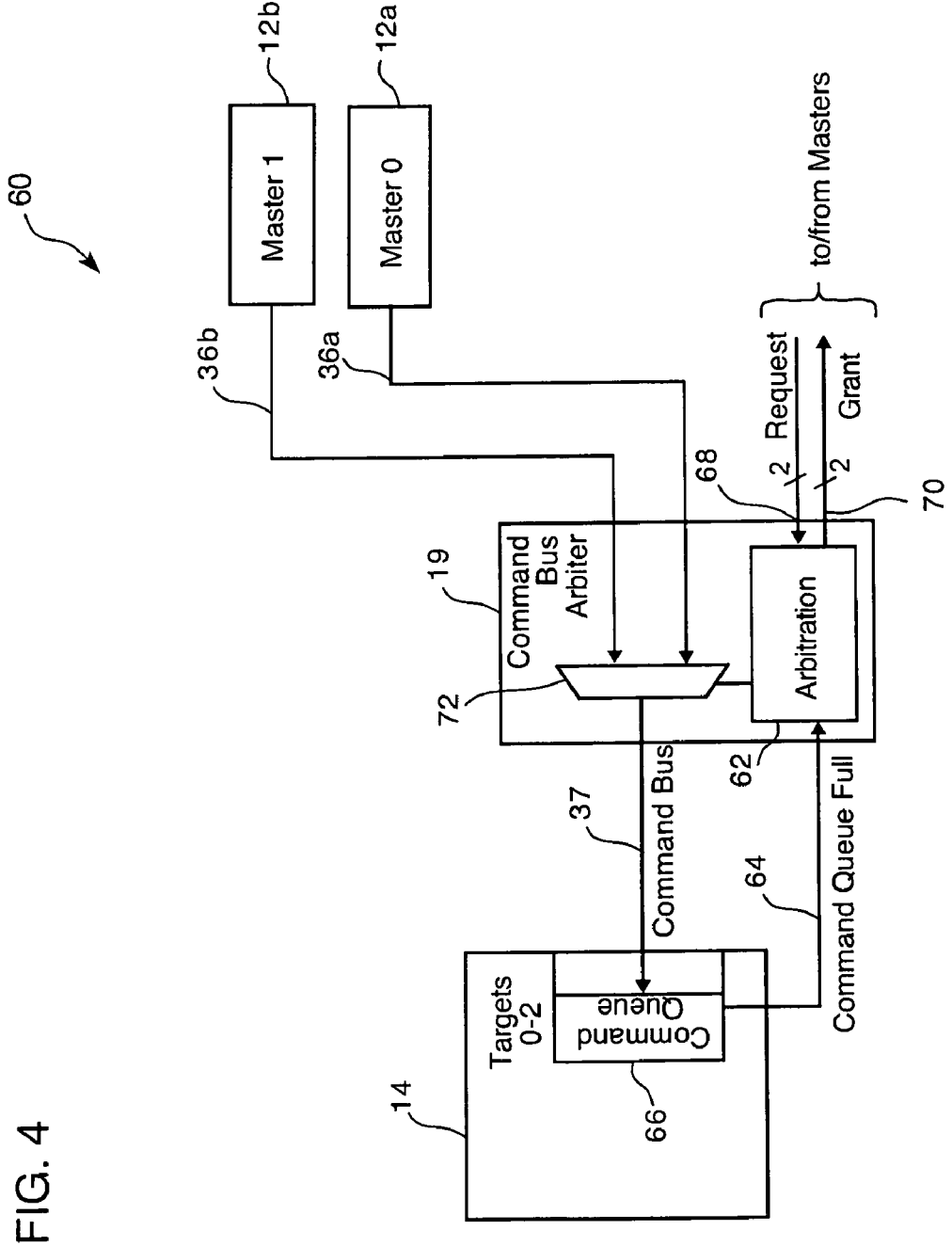
FIG. 4 is a schematic diagram of an exemplary command bus data path of the processing system.

Referring to FIG. 4, a command bus data path 60 is shown. The command arbiter 19 includes an arbitration unit 62 that receives a command queue full signal 64 as input from each of the targets 14. The command queue full signal 64 indicates when a threshold fullness of a command queue 66 in each target has been reached. The arbitration unit 62 receives command requests over command request input lines 68 from the masters 12, and provides on grant output lines 70 to the masters 12 grants to the command bus requests by the masters 12.

Each bus master 12 that wishes to drive a command on the command bus 30 first sends a request to the arbitration unit 60 on a respective one of the input lines 68. This request indicates the ID of the target with which the master wishes to communicate. As mentioned earlier, the arbitration unit 62 also receives signals from each target 14 indicating whether that target's command queue 66 is full or not. The arbitration unit 62 uses the command queue full information to inhibit grants to the command requesters if the command queue of the target they need is full, while permitting requesters to other targets to obtain grants. The arbitration policy of the arbitration unit 62 may be, for example, a round robin policy, and may employ a programmable priority for certain masters. The arbitration scheme of the arbitration unit 62 opportunistically grants access to another bus master when one of two conditions occur: a master is scheduled to be granted access but does not have a request pending; or a master is scheduled to be granted access but the requested target's command queue is full.

When the arbitration unit 62 has granted a bus request of a master, that master transmits a command on a corresponding one of the master command buses 36, to the command bus arbiter 19. The command bus arbiter 19 also includes a multiplexor (MUX) 72 that receives a command from a master and is enabled by the arbitration unit 62 to control the transmission of the command over the command bus 37 to the targets.

Figure 5:
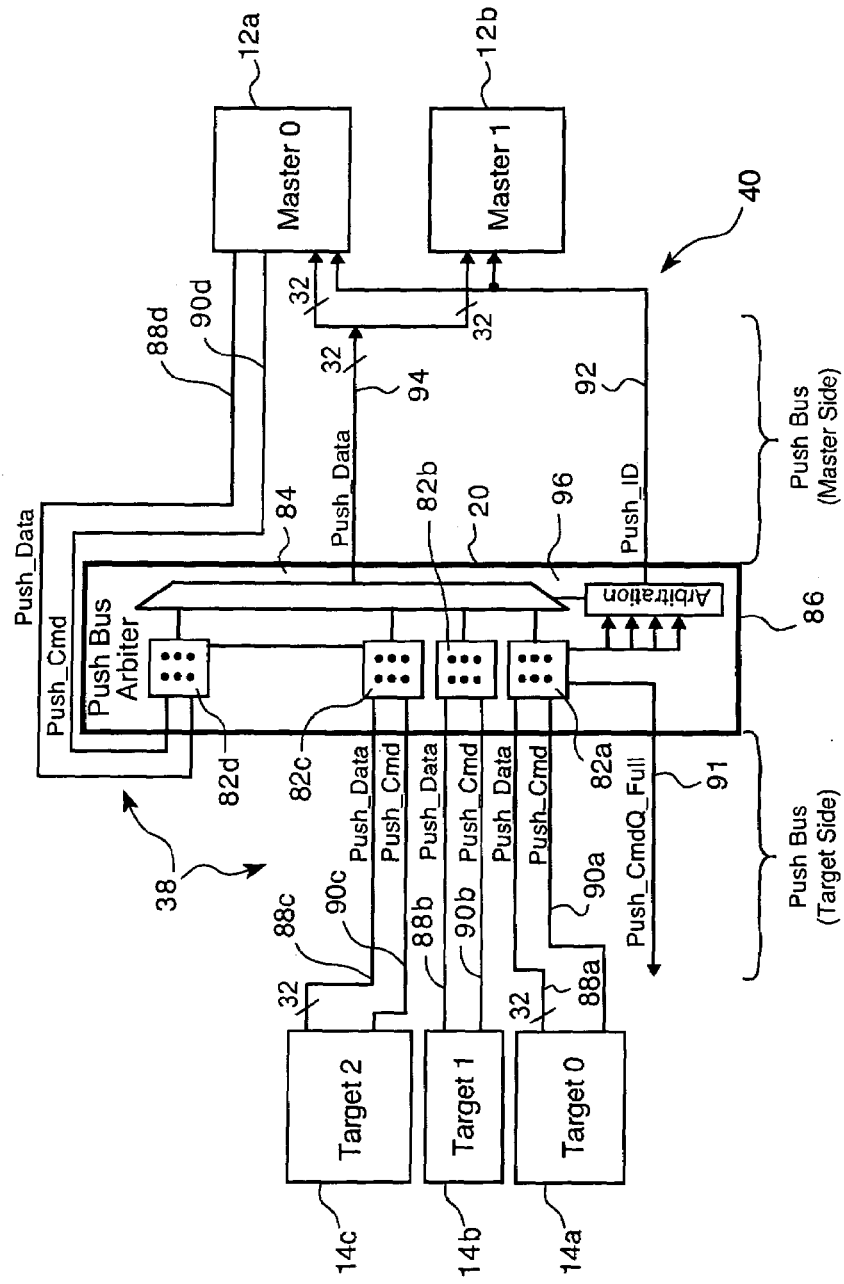
FIG. 5 is a schematic diagram of an exemplary push bus data path of the processing system.

FIG. 5 shows details of a push bus datapath 80. The push bus arbiter 20 includes multiple push command queues 82a, 82b, 82c, 82d, one for each supported target, coupled to a multiplexor (MUX) 84 and a push bus arbitration unit 86. The push command queues 82a, 82b, 82c, 82d are coupled to corresponding targets 14a, 14b, 14c and target "master 12a" (for operations in which master 0 functions as a target), respectively, by sets of push data buses 88 and push command buses 90, one set for each target in the system, that is, buses 88a and 90a for target 14a, buses 88b and 90b for target 14, buses 88c and 90c for target 14c and buses 88d and 90d for master 12a (as a target). The target side bus 38 also includes a push command queue full signal (Push_CmdQ_Full) 91 to indicate to a target that its corresponding push command queue has reached a predetermined fullness level. The master side push bus 40 (from FIG. 2) includes a push ID bus 92 and a push data bus 94.

A target, having received and decoded a command that was intended for it, sends requested data to a corresponding one of the queues 82 on the corresponding push data bus 88. Thus, the push command queues store a combination of push data and push commands. The push commands include push IDs, which are provided to the arbitration units 86.

Data stored in entries of the push command queues 82 are provided to the MUX 84. The arbitration unit 86 selects one of the push command queues 82. The arbitration unit 86 thus provides a select signal 96 to the MUX 84 to enable MUX 84 to provide as output (for transmission onto the push data bus 94) data from the selected push command queue and transmits the push ID from the selected push command queue onto the push ID bus 92.

Figure 6:
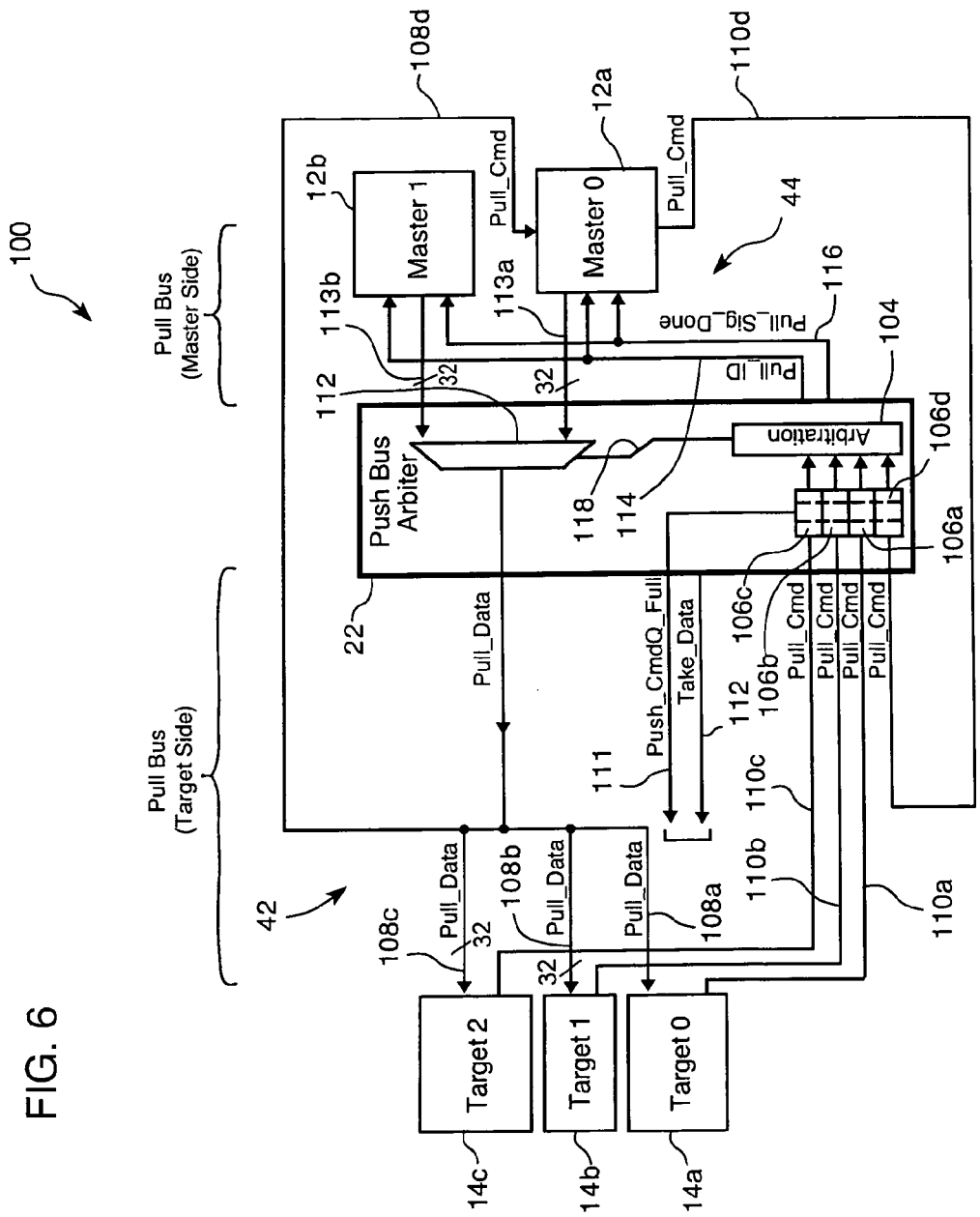
FIG. 6 is a schematic diagram of an exemplary pull bus data path of the processing system.

Referring to FIG. 6, a pull bus data path 100 is shown. On the target side of the pull bus arbiter 22, the targets 14 are coupled to the pull bus arbiter 22 by the pull bus 42 (from FIG. 2). The masters 12 are coupled to the pull bus arbiter 22 by the master side pull bus 44 (from FIG. 2). The targets 14 are end points and the masters 12 are sources for a pull operation.

The pull bus arbiter 22 includes a multiplexor (MUX) 102, an arbitration unit 104 and pull command queues 106a, 106b, 106c, 106d, one for each supported target, coupled to the pull bus arbitration unit 104. The pull command queues 106a, 106b, 106c, 106d are coupled to corresponding targets 14a, 14b, 14c and target "master 12a" (for operations in which master 0 functions as a target), respectively, by pull data buses 108a, 108b, 108c and 108d, respectively, and pull command buses 110a, 110b, 110c and 110d, respectively.

Collectively, the buses 108, 110 make up the target side pull bus 42. The arbiter 22 also provides a pull command queue full signal (Pull_CmdQ_Full) 111 to a target to indicate to the target that the corresponding pull command queue 106 is almost full, and a signal Take_Data 112 to indicate to a target that pull data has been transferred to that target.

The master side pull bus 44 includes a pull data bus 112a for master 12a and a pull data bus 113b for master 12b. The pull data bus 113 is used by the masters to send pull data to the arbiter 22, or more specifically, to the multiplexor 102. The pull bus 44 also includes a pull ID bus 114 and pull done signal (Pull_Sig_Done) 116 that allow the arbiter 22 to provide information to the masters during a pull (or write) operation.

Each of the targets uses a data buffer (not shown) to store pull (or write) data. The target receives the command 50 over the command bus 37 (shown in FIGS. 2 and 4) and determines from the command's operation type field 52b (FIG. 3) that the operation is a pull operation. When the target has room in the data buffer for the amount of data specified in the command, it arbitrates for the use of the pull data bus 34. The information specifying the location of the data (that is, which master and which storage location being used by the master for the data) was presented in the pull ID field 53 of the command 50. Because that information is in a command field, the unit identified as the source of the pull data does not need to be the master that sent the command. The source can be any addressable unit that has a path to the pull data bus 108.

Each target sends the full Pull ID and length (derived from the command 50) for information it would like to pull to the target. The target must have buffer space available for the pull data when it asserts the Pull ID via the corresponding pull command bus 110.

The Pull ID is enqueued in a corresponding one of the pull command queues 106 in the pull bus arbiter 22 unless the Pull_CmdQ_Full signal 111 is asserted for that pull command queue. The assertion of the Pull_CmdQ_Full signal 111 indicates that the pull command queue 106 for that specific target has reached a predetermined fullness threshold.

The arbitration unit 104 arbitrates among the currently valid pull IDs enqueued in the pull command queues 106 to select a target, or more specifically, a pull ID enqueued by that target. The arbitration policy can be one of a number of well known schemes, for example, round robin, or a priority based scheme. The arbitration unit 104 sends the selected pull ID to the corresponding source over the pull ID bus 114. The pull bus arbiter 22 asserts the Take_Data signal 112 to the selected target. The source provides the pull data to the MUX 102, which is enabled to send the pull data onto the pull data bus 108 by the arbitration unit 104 via control signal 119. The arbitration unit 104 asserts the pull done signal 116 to the source.

Thus, write data transport is under the control of the target. The target of a write operation pulls the write or pull data over the pull bus 34 when it needs it, rather than having it sent at the same time as the write operation type. Therefore the target can allocate internal buffers for the pull data based on when the target needs the data and has available buffer space. Also, as mentioned earlier, the target can get write data from a source other than the command initiator, as directed by information in the command.

The architecture of system 10 provides for flexible bandwidth allocation via multiple instantiations of the various buses and arbiters. Because there are separate buses for commands, push data, and pull data, the buses can be added incrementally as needed.

Referring back to FIG. 4, if the control bandwidth for an application is insufficient, one or more additional copies of the command bus 37 and arbiter 19 could be added to the system. Each arbiter 19 could support a subset of the masters (for example, in a four-master implementation in which two arbiters are used, each arbiter could support a different pair of the masters), but the targets would receive commands from all of the masters.

For increased data bus bandwidth, copies of the push bus and pull bus, along with the appropriate arbitration logic, could be added. For example, referring back to FIG. 5, additional master-side buses 40 and arbiters 20 could be added to the system. Each target's push data bus 88 and command bus 90 would be coupled to each of the arbiters so there would be no need for a target to drive more than one set of push data/command buses. Each arbiter would have to be aware of the masters (destinations) to which it is wired, and enqueue the data and IDs accordingly. Each arbiter 20 and associated bus 40 could be connected to a subset of the sources.

Referring to FIG. 6, copies of the target side pull bus 42 and associated arbitration logic could be added to the system. Each arbiter 22 and bus 42 would be connected to each of the targets. Each arbiter 22 and associated bus 44 could support a subset of the sources. The pull bus arrangement would be similar to the push bus arrangement in that each target only needs to drive one copy of the pull ID to all of the arbiters. However, unique copies of the pull data are needed, as it is possible that the pull buses would have valid data on them on the same cycle. In the case of both push and pull buses, all of the arbiters would be connected to all targets, allowing data to be moved between any master and any target.

Other embodiments are within the scope of the following claims.

What is claimed is:

1. A method comprising:
   transferring a command including a target identification between one or more bus masters and bus targets over a multiprocessor bus structure, the command including information that is interpreted differently by one of the bus targets based on the target identification.

2. The method of claim 1 wherein the target identification is a field in the command.

3. The method of claim 1 wherein the bus structure includes a separate command bus, push bus and pull bus.

4. The method of claim 1 wherein transferring includes sending the command to all of the bus targets over the command bus so that each bus target can determine if the command is intended for such target.

5. The method of claim 1 wherein the command is formatted to specify one of a plurality of operation types, and the command includes at least one field that is interpreted according to the which one of the plurality of operation types is specified in the command.

6. The method of claim 2 wherein at least one of the units acts as one of the bus masters at times and acts as one of the bus targets at other times.

7. The method of claim 3 wherein the bus structure further includes arbiters, the arbiters including a command arbiter associated with the command bus, a push arbiter associated with the push bus and a pull arbiter associated with the pull bus.

8. The method of claim 3, wherein the bus target identified in the command controls the transfer of information over the push bus to one of the bus masters for a push operation.

9. The method of claim 3 wherein the bus target identified in the command is operable to control transfer of information over the pull bus from one of the master buses to the bus target for a pull operation.

10. The method of claim 9 wherein the one of the bus masters is identified in the command by an identifier in a source field in the command.

11. The method of claim 8 wherein the one of the bus masters is identified in the command by an identifier in a destination field in the command.

12. The method of claim 7 wherein the bus masters arbitrate for use of the command using the command arbiter, and the bus targets arbitrate for use of the push and pull buses using the respective push and pull arbiters.

13. An article comprising:
a storage medium having stored thereon instructions that when executed by a machine result in the following:
transferring a command over a multiprocessor bus to bus targets, the command being formatted to identify one of the bus targets and include information that is interpreted differently based on which one of the bus targets is identified.

14. The article of claim 13 wherein the bus structure includes a separate command bus, push bus and pull bus.

15. An apparatus comprising:
a plurality of units;
a multiprocessor bus structure to enable communication exchanges between the units connected to the bus structure, with one or more of the units being bus masters and others of the units being bus targets, the bus masters operable to send a command to bus targets over the bus structure, the command formatted to identify one of the bus targets and having information that is interpreted differently based on which one of the bus targets is identified.

16. The apparatus of claim 15 wherein the bus structure includes a separate command bus, push bus and pull bus.

17. The apparatus of claim 15 wherein the command is formatted to specify one of a plurality of operation types, and the command includes at least one field that is interpreted according to the which one of the plurality of operation types is specified in the command.

18. The apparatus of claim 16, wherein the command is sent to all of the bus targets over the command bus to all of the bus targets and each bus target determines if the command is intended for such target.

19. The apparatus of claim 16, wherein the bus target identified in the command is operable to control transfer of information over the push bus to one of the bus masters for a push operation.

20. The apparatus of claim 16, wherein the bus target identified in the command is operable to control transfer of information over the pull bus from one of the bus masters to the bus target for a pull operation.

21. The apparatus of claim 19, wherein the one of the bus masters is identified in the command by an identifier in a destination field in the command.

22. The apparatus of claim 20, wherein the one of the bus masters is identified in the command by an identifier in a source field in the command.

23. An apparatus comprising:
a bus master operable to send a command to bus targets over a multiprocessor bus structure, the command being formatted to identify one of the bus targets and including information that is interpreted differently based on which one of the bus targets is identified.

24. The apparatus of claim 23 wherein the command is formatted to specify one of a plurality of operation types, and the command includes at least one field that is interpreted according to the which one of the plurality of operation types is specified in the command.

25. An apparatus comprising:
a bus target operable to receive a command from a bus master over a multiprocessor bus structure, the command being formatted to identify the bus target that receives the command; and
logic in the bus target to interpret information that is received by the bus target identified in the command, wherein the logic in the bus target interprets the information differently than corresponding logic in different bus target connected to the bus structure.

26. The apparatus of claim 25 wherein logic processes the command that is formatted to specify one of a plurality of operation types, and the command includes at least one field interpreted according to the which one of the plurality of operation types is specified in the command.

* * * * *